United States Patent
Andraszek

(10) Patent No.: US 9,838,538 B1
(45) Date of Patent: Dec. 5, 2017

(54) USING REAL-TIME SPEECH ANALYTICS TO NAVIGATE A CALL THAT HAS REACHED A MACHINE OR SERVICE

(71) Applicant: Noble Systems Corporation, Atlanta, GA (US)

(72) Inventor: Joseph Andraszek, Oklahoma City, OK (US)

(73) Assignee: Noble Systems Corporation, Atlanta, GA (US)

(*) Notice: Subject to any disclaimer, the term of this patent is extended or adjusted under 35 U.S.C. 154(b) by 0 days.

(21) Appl. No.: 15/271,684

(22) Filed: Sep. 21, 2016

(51) Int. Cl.
| | | |
|---|---|---|
| H04M 3/00 | (2006.01) | |
| H04M 5/00 | (2006.01) | |
| H04M 1/64 | (2006.01) | |
| H04M 3/51 | (2006.01) | |
| G10L 15/30 | (2013.01) | |
| G10L 25/51 | (2013.01) | |

(52) U.S. Cl.
CPC .......... *H04M 3/5158* (2013.01); *G10L 15/30* (2013.01); *G10L 25/51* (2013.01); *H04M 3/5183* (2013.01)

(58) Field of Classification Search
CPC ....... H04M 3/5158; H04M 2203/2027; H04M 3/5183; H04M 3/523
USPC ............ 379/266.07, 266.08, 266.01, 265.07, 379/265.05, 88.01, 265.02, 265.11
See application file for complete search history.

(56) References Cited

U.S. PATENT DOCUMENTS

| | | | |
|---|---|---|---|
| 6,041,116 A | 3/2000 | Meyers | |
| 6,195,417 B1 | 2/2001 | Dans | |
| 6,697,461 B1 | 2/2004 | Middleswarth et al. | |
| 6,850,602 B1 | 2/2005 | Chou | |
| 6,990,179 B2 | 1/2006 | Merrow et al. | |
| 7,043,006 B1* | 5/2006 | Chambers | H04M 3/5158 379/265.02 |
| 2004/0002865 A1 | 1/2004 | Chan et al. | |
| 2008/0159495 A1 | 7/2008 | Dahan | |
| 2009/0207996 A1 | 8/2009 | Berger et al. | |
| 2014/0065582 A1* | 3/2014 | Wyss | G09B 19/00 434/219 |
| 2014/0334612 A1* | 11/2014 | Singer | H04M 3/5166 379/88.01 |

OTHER PUBLICATIONS

Office Action Received for U.S. Appl. No. 15/271,621 dated May 25, 2017.

\* cited by examiner

*Primary Examiner* — Thjuan K Addy

(57) ABSTRACT

Various embodiments of the invention provide methods, systems, and computer program products for using real-time speech analytics to navigate a call that has reached a machine or service. In various embodiments, a call leg is established from a call handler handling the call to a speech analytics system configured to analyze the call to detect keywords. As the speech analytics system monitors the call, the speech analytics system sends an event to the call handler upon detecting a keyword. In turn, the call handler carries out some action based on the event that is configured to advance the progress of the call. Accordingly, if the call handler determines a live party has been reached on the call as result of the action, the call handler connects the call with a second live party to converse with the live party reached on the call.

21 Claims, 12 Drawing Sheets

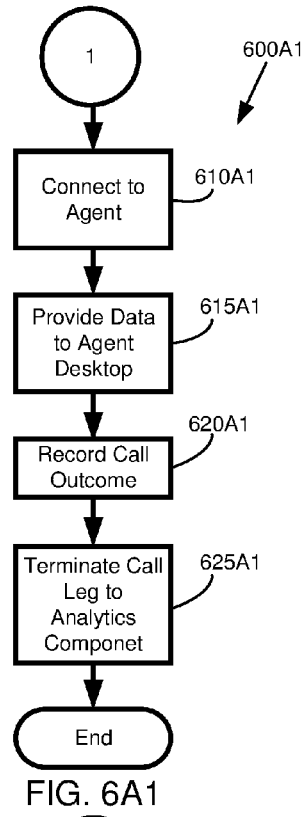
FIG. 6A1
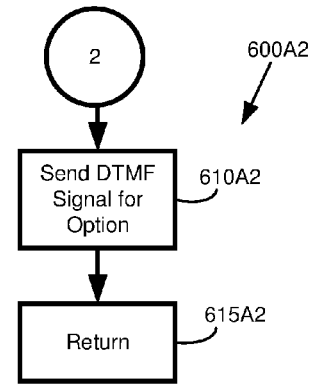
FIG. 6A2
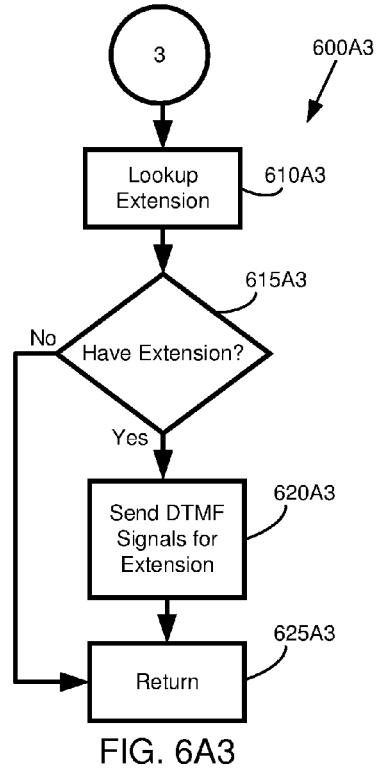
FIG. 6A3
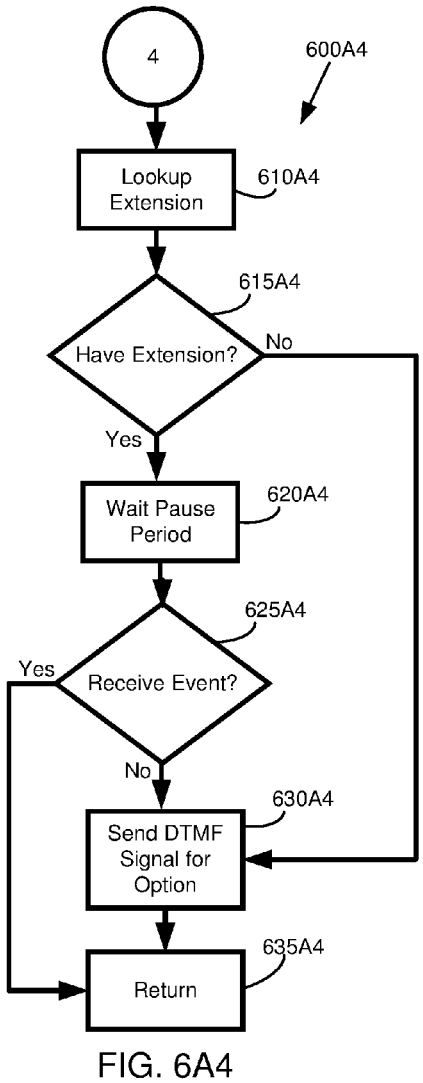
FIG. 6A4

USING REAL-TIME SPEECH ANALYTICS TO NAVIGATE A CALL THAT HAS REACHED A MACHINE OR SERVICE

BACKGROUND

In contact centers, one of the primary benefits of using an automated dialing device (e.g., a predictive dialer) to place outbound calls is the ability for such a device to screen out unproductive calls, or at least a portion of them, without having to involve agents. That is to say, an automated dialing device is able to ascertain the difference between live parties and answering machines or voice mail services answering calls and can "screen out" such calls, thus only passing calls that have been answered by live parties to agents. Accordingly, this allows agents to spend more time speaking with their intended parties and as a result dramatically increases the overall productivity of the contact center. Such "call screening" capabilities are generally referred to as "call progress analysis."

However, the use of automated dialing devices is generally not recommended for business-to-business ("B2B") environments because of the current call progress analysis capabilities of such devices in detecting machines and services. This is because a large majority of business phone systems answer calls using some type of automation such as an auto attendant (e.g., interactive voice response system—"IVR") or hold queue, which an automated dialing device will typically classify as an answering machine. It is noted that although the terms "machine" and "service" are used throughout this disclosure, the two terms are used interchangeably to represent a call initially reaching something besides a live party. Thus, traditional automated dialing devices normally screen out almost all calls placed to businesses from ever reaching an agent. As a result, the use of an automated dialing device loses a large portion of its value in a B2B environment and contact centers making such calls must typically resort to using less productive modes for making calls to businesses such as preview dialing and/or manual dialing. With that said, agents placing calls to businesses using preview dialing and/or manual dialing often spend over seventy percent of their time throughout the day trying to reach a live party (right party contact) with the vast majority of agents' time spent listening to and navigating auto attendants and/or voice mail messages, and in many cases waiting on hold for an operator.

Furthermore, calls connecting to phone numbers on wireless networks can often result in garbled audio or signals with excessive noise on the line, gaps of silence between the call being answered by the network and a voicemail greeting playing, and other issues inherent to wireless and cellular networks. Such issues can make it difficult for standard call progress analysis ("CPA") algorithms to accurately determine if a call has been answered by a live person, a voicemail system, or not at all. In many cases a dialing system may determine a call to a wireless number has reached an answering machine and begin playing a prerecorded message prematurely due to long pauses during the carrier greeting. Overall, CPA accuracy for wireless numbers is currently far lower than it is for traditional land lines, and as wireless phone usage continues to increase around the world, this lack of accuracy will continue to hinder performance and efficiency for countless businesses.

Thus, a need in the art exists for augmenting the call progress analysis performed by automated dialing devices to better handle B2B and wireless dialing environments. More specifically, a need in the art exists for augmenting the call progress analysis performed by automated dialing devices to recognize different machines/services used by businesses and wireless networks to answer calls. Furthermore, a need in the art exists to enable automated dialing devices to negotiate with such machines/services to help call progression once it has been determined a machine or service has answered a call. It is with respect to these considerations and others that the disclosure herein is presented.

BRIEF SUMMARY

In general, embodiments of the present invention provide computer program products, methods, systems, apparatus, and computing entities for using real-time speech analytics to navigate a call that has reached a machine or service. For instance, in various embodiments, a call leg is established from a call handler handling a call to a speech analytics system configured to analyze the audio of the call over the call leg to detect keywords in real-time. Here, the speech analytics system monitors the audio of the call and sends an event to the call handler upon detecting a keyword in the audio of the call.

In turn, the call handler carries out some action with respect to the call based on the event that is configured to advance the progress of the call to attempt to reach a live party on the call. For instance, the event may indicate to the call handler to select a menu option to reach a live party such as an operator or receptionist. Thus, the action carried out by the call handler may comprise sending a dual-tone multi-frequency signal or a sound over the audio of the call to select the menu option. While in another instance, the event may indicate to enter a telephone extension to reach a live party. Here, the action carried out by the call handler may comprise sending a plurality of dual-tone multi-frequency signals or a plurality of sounds over the audio of the call to enter a telephone extension to attempt to reach a particular party. At some point, the call handler may determine that a live party has been reached on the call as result of carrying out one or more actions and accordingly, the call handler then connects the call with a second live party so that the second live party can converse with the live party reached on the call.

The subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein:

FIGS. 5, 6A, 6A1-6A4, 6B, and 6C are flowcharts illustrating a navigation module that can be used in accordance with various embodiments of the present invention.

DETAILED DESCRIPTION

Figure 1:
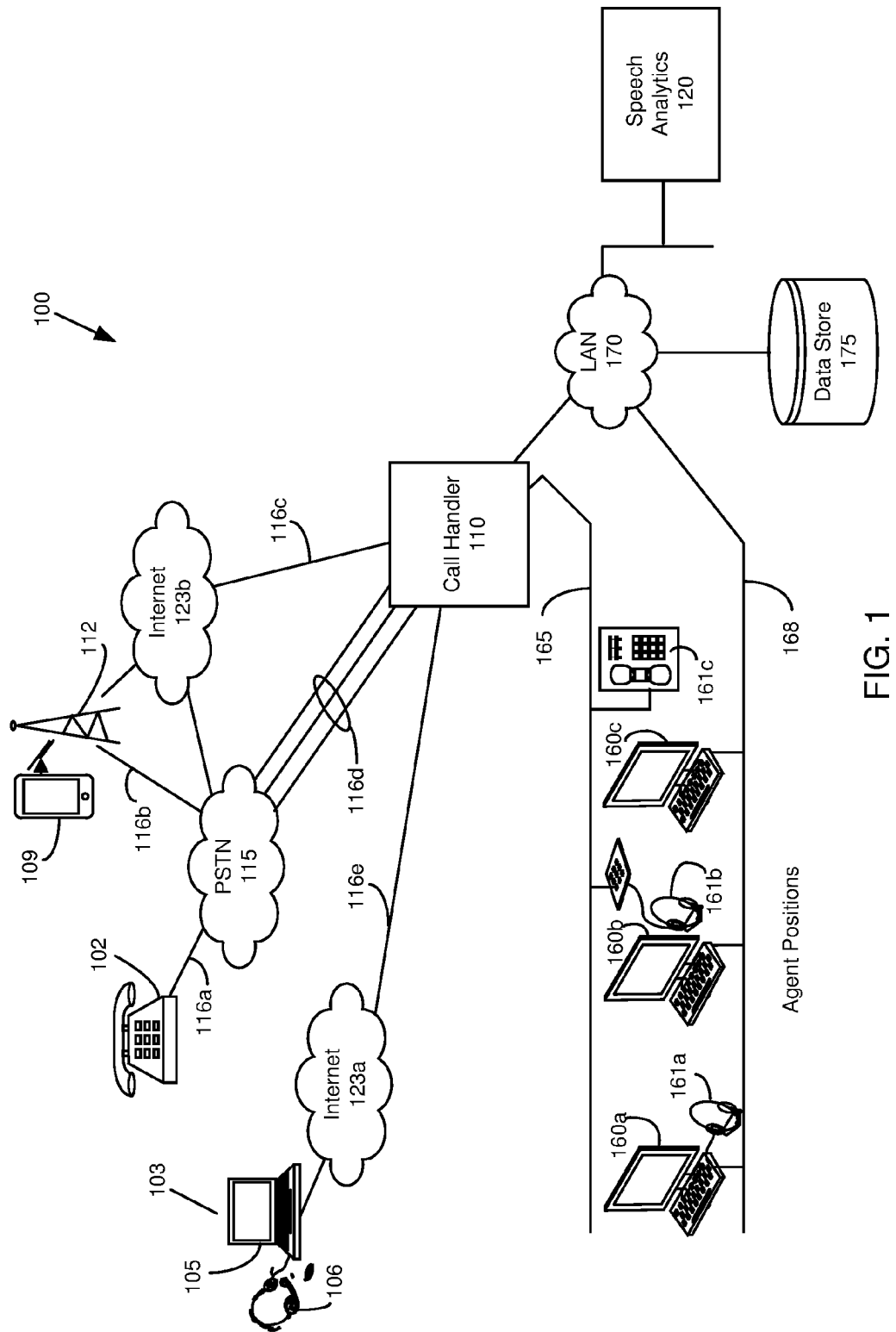
FIG. 1 shows a contact center architecture illustrating the technologies disclosed herein accordingly to various embodiments.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

The embodiments of the invention are discussed herein in the context of a contact center environment. However, those of ordinary skill in the art can readily appreciate the applicability of various embodiments of the invention in other environments such as, for example, hospitals, government agencies, or entities providing emergency and/or hotline services. Thus, the scope of the invention is not intended to be limited to use in a contact center environment and should not be construed as so.

Exemplary Contact Center Architecture

Turning now to FIG. 1, this figure shows one embodiment of a contact center architecture 100 that may be used in accordance with the various technologies disclosed herein. In this instance, the contact center includes a call handler 110 that, depending on the embodiment, may simply be an automated dialing device (e.g., a dialer) configured to originate voice calls to attempt to reach various parties or may be comprised of multiple components such as, for example, a dialer, a switching component, and a host component.

In this particular configuration, the host component controls and handles distribution of calls within the contact center, while the switching component controls telephony functions and acts as a communications layer between the host component and the various networks used by telecommunications providers to transfer telephony traffic. For instance, the switching component may communicate with the host component via a socket connection and is configured to receive outbound call requests from the host component and send the requests to the telecommunications providers' networks. Accordingly, the switching component interfaces with the dialer, which in turn acts as the conduit between the switching component and the networks of the telecommunications providers.

To place an outbound call, the host component sends a dial request to the switching component and the switching component processes the request and sends it to the dialer. For instance, the dial request may identify the line to use to dial out the call and a dial string. In turn, the dialer receives the dial request, maps the request to the proper technology type for the request (e.g., selects the appropriate channel driver based on the dial string for the request), and sends the request to the technology it matches. The chosen technology then originates the call out to the telecommunications provider via the appropriate network based on the settings for the chosen technology. At this point, the telecommunications provider places the call to the intended party and sends the result of the call (e.g., a connect, no answer, busy signal, disconnected number, etc.) to the dialer. The dialer processes the result and sends it to the switching component and accordingly, the switching component may inform the host component of the outcome of the call.

Accordingly, in various embodiments, the call handler 110 may be configured to dial one or more lists of telephone numbers (e.g., "call lists") to initiate outbound calls and these "call lists" may be generated based on a number of accounts stored in some type of storage media 175 that is accessible using a local network 170. In addition, the call handler 110 may have the capability to predictive dial, which makes use of one or more pacing algorithms to determine how and when to dial a group of numbers so as to minimize the likelihood of a called party being placed in a queue while maintaining effective agent utilization. That is to say, in particular embodiments, the call handler 110 has the capability to "dial ahead" by originating more calls than there are available agents, expecting some calls not to be answered and/or more agents to become available to handle all the answered calls.

Depending on the embodiment, the call handler 110 may originate outbound voice calls to a variety of different phone types. For instance, a call may be originated to a conventional analog telephone 102 connected to a public switched telephone network ("PSTN") 115 using an analog plain old telephone service ("POTS") line 116a. Accordingly, the call handler 110 may interface with voice trunks using facilities 116d to the PSTN 115 that may include, for example, Ti trunks, SONET based fiber optic networks, ATM networks, or PSTN trunks.

In addition, a call may be originated to a mobile device 109, such as a smart phone or tablet, which wirelessly communicates with a mobile service provider ("MSP") 112. The call to the mobile device 109 may be routed from the PSTN 115 to the MSP 112 using an integrated services digital network ("ISDN") interface 116b or some other type of interface well known to those skilled in the art or may be routed from the call handler 110 over a trunk 116c to an Internet provider 123b as packetized voice, referred to herein as voice-over-IP ("VoIP"), using Internet-based protocols and on to the MSP 112. For convenience, unless indicated otherwise, the term "trunk" refers to any type of facility 116c, 116d, or 116e providing voice calls to, or from, the contact center, regardless of the type of protocol or technology used. Specifically, a "trunk," as referred to herein, is not limited to time-division multiplexing ("TDM") technology.

Furthermore, a call may be routed to a so-called "IP phone," "VoIP phone," or "soft phone" 103. In particular instances, this device 103 may comprise a computing device 105, such as a laptop, desktop, or computing tablet that interfaces with a headphone/microphone combination, also referred to as a "headset" 106. In addition, this device 103 may use a digital voice control protocol and may process packetized voice data according to various Internet based voice protocols, such as session initiated protocol ("SIP"). Furthermore, the call may be conveyed by other types of Internet providers 123a, such as a cable company providing Internet access services over a coaxial cable facility 116e. Those skilled in the art will recognize that a variety of protocols and facilities may be used to convey voice calls.

Accordingly, as outbound calls are originated, the call handler 110 in various embodiments is configured to establish call legs to a speech analytics component 120. Thus, in particular embodiments, the call center architecture 100 may include one or more dedicated trunks between the call handler 110 and the speech analytics component 120 or one or more data connections suitable for conveying voice over IP between the call handler 110 and the speech analytics component 120 using the LAN 170 to support these call legs.

In turn, the speech analytics component 120 analyzes audio for each answered outbound call once a call leg is established for the call and provides an indication (e.g., event notification) when a particular word or phrase is detected. This word or phrase is referred to as a "keyword," although use of the term "keyword" should not be construed as limiting recognition to a single word. Accordingly, a number of different analytics approaches may be employed by the speech analytics component 120 depending on the embodiment. For example, the speech analytics component 120 may make use of one or more of a phonetics approach, large-vocabulary continuous speech recognition (LVCSR) approach, and/or direct phrase recognition approach in performing voice analytics on the telephone calls.

As is discussed in greater detail below, the call handler 110 makes use of these event notifications to handle different situations in which the answered call has encountered a "machine," as opposed to a live party, such as an auto attendant or voice mail service. As further detailed below, the call handler 110 may handle these different situations by making use of various mechanisms such as, for example, dual-tone multi-frequency signaling ("DTMF"), digital voice, or voice recordings to attempt to engage the different types of machines/services that may be encountered and in some instances, to attempt to reach a live party.

Once the call handler 110 has determined a live party has been reached, the call may be routed in various embodiments over facilities 165 to an agent for servicing. The physical area at which the agent sits is often referred to as an agent "position" and these positions are often grouped into clusters that are managed by a supervisor, who may monitor calls and the agents' productivity. According to various embodiments, an agent typically uses a computing device, such as a computer 160a-160c and a voice device 161a-161c. In particular embodiments, data may be provided to an agent's workstation computer 160a-160c over facilities 168 along with routing the call to the agent's workstation voice device 161a-161c over other facilities 165. The combination of computer 160a-160c and voice device 161a-161c may be referred to as a "workstation." Thus, the workstation collectively has a data capability and a voice capability, though separate devices may be used. In some instances, "workstation" may be used in reference to specifically either the data or voice capability at the agent's position, as appropriate to the context. For example, "routing the call to the agent's workstation" means routing a call to a voice device 161a-161c at the agent's position. Similarly, "routing the call to the agent" means routing a call to the appropriate equipment at an agent's position.

Depending on the embodiment, the voice device used by an agent may be a soft phone device exemplified by a headset 161a connected to the computer 160a. The soft phone device may be a virtual telephone implemented in part by an application program executing in a computer. The voice device may also comprise an Internet Protocol ("IP") based headset 161b or a conventional phone 161c. Thus, use of the term "phone" is intended to encompass all these types of voice devices used by an agent.

Those skilled in art will recognize FIG. 1 represents one possible configuration of a call center architecture 100, and that variations are possible with respect to the protocols, facilities, components, technologies, and equipment used. For example, various algorithms and queuing arrangements may be defined to efficiently process and/or place calls. Furthermore, although many aspects of contact center operation are disclosed in the context of voice calls, the contact center may process other forms of communication such as, for example, facsimiles, emails, text messages, video calls, and chat messages.

Figure 2:
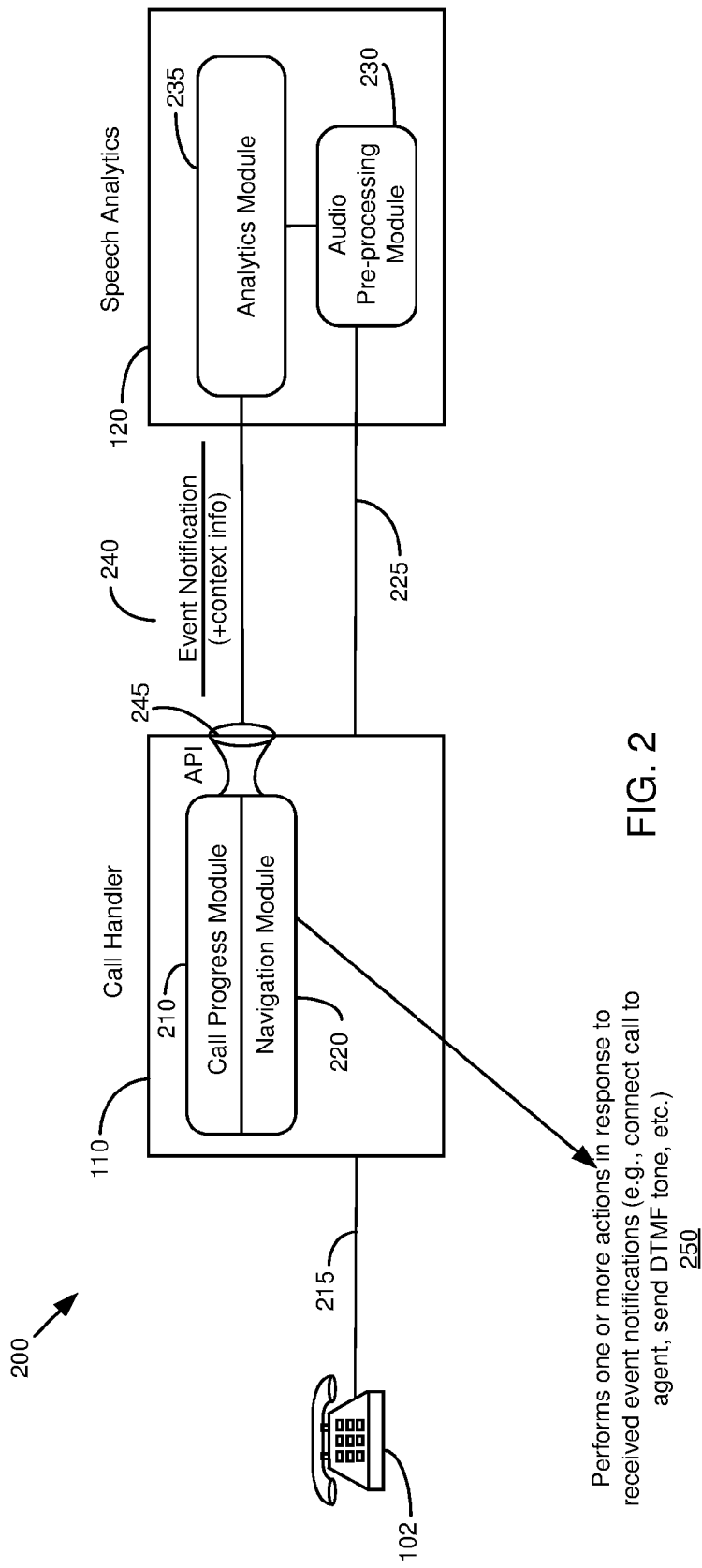
FIG. 2 shows an architecture for using a speech analytics component in conjunction with a call handler accordingly to various embodiments.

Continuing on, an architecture 200 illustrating the use of the speech analytics component 120 in conjunction with the call handler 110 according to various embodiments of the invention is shown in FIG. 2. In this instance, the call handler 110 has originated a call to a device 102 and executes a call progress module 210 to make determinations as to how the call is progressing once originated to the device 102. Specifically, in various embodiments, the call progress module 210 is configured to determine whether the call placed to the device 102 has been answered (completed) or not due to some condition such as a no answer (the call continues to ring without being picked up) or the line is busy or disconnected. If the call progress module 210 determines the call has not been answered, then the call is screened out so that it is not forwarded to an agent.

However, if the call progress module 210 determines the call has been answered, then the call handler 110 establishes a call leg 215 to the called device 102 and a call leg 225 to the speech analytics component 120. Note that in some instances, the call leg 225 to the speech analytics component 120 may have been established at the time the call was originated instead of waiting until the call has been answered. Accordingly, in various embodiments, the call progress module 210 then determines at this point who or what has actually answered the call, either a live party or a machine/service (e.g., an auto attendant, answering machine, or voice mail service). As discussed in further detail below, the call progress module 210 goes about identifying who or what has answered the call in various embodiments by listening to the audio on the call and more specifically, by listening to, for example, the cadence, presence of vocal audio energy, noise, or other audio characteristics on the call. While in particular embodiments, the call progress module 210 may employ the speech analytics component 120 to assist in this task. Here, if the call progress module 210 determines a live party has answered the call, then the call is forwarded to an agent for handling. However, if the call progress module 210 instead determines that a machine/service has answered the call, then the call progress module 210 invokes a navigation module 220 to aid in navigating different machines (e.g., an auto attendant or voice mail). As discussed in further detail below, the navigation module 220 employs the speech analytics component 120 to monitor and analyze the audio provided on the call and detect the presence of keywords to assist in navigating different machines.

Here, the speech analytics component 120 shown in FIG. 2 comprises an audio pre-processing module 230 for receiving the audio on the call leg 225 and performing pre-processing on the audio. Depending on the embodiment, this pre-processing may involve the module 230 performing various normalizing and/or signal processing methods on the audio before providing the audio to an analytics module 235 that then processes the audio to detect keywords. For example, in particular embodiments, the audio pre-processing module 230 may break the audio into phonemes used in detecting keywords.

Accordingly, the analytics module 235 is configured to monitor the audio to detect keywords and to send event notifications to the call handler 110 when keywords are detected. Thus, in various embodiments, the analytics module 235 is configured to read a defined set of keywords, monitor the audio for the call to detect when any of these defined keywords are present in the audio, and send event notifications to the call handler 110 accordingly. In some embodiments, the analytics module 235 may also be configured to send notifications for other conditions besides the detection of keywords such as, for example, the detection of silence (non-audio) in the audio for a certain period of time or the absence of certain keywords within a certain period of time. For example, the analytics module 235 may detect certain keywords and be configured to then listen for other keywords within a certain period of time after detection of these keywords. Therefore, in this instance, the analytics module 235 sends a notification if it does not detect the other keywords within the certain period of time.

Furthermore, depending on the embodiment, the analytics module 235 may be configured to execute once and operate on all incoming call legs 225 together or execute and operate on each individual incoming call leg 225 separately. Therefore, in particular embodiments, the analytics module 235 is configured to perceive call leg identification information for a call leg 225 for a particular call so that such information can be associated with keyword detection. Such association may be important because in many instances, the speech analytics component 120 may be monitoring a number of calls simultaneously via a number of different call legs 225 and thus, it may be necessary for the speech analytics component 120 to be able to identify a particular call leg 225 so that the component 120 can identify which call is associated with a particular detection of a keyword.

Continuing on, the speech analytics component 120 communicates event notifications 240 in various embodiments to the call handler 110 by using an application programming interface 245. Accordingly, this interface 245 may receive event notifications 240 using a LAN, WAN, bus, or other communication facility between the speech analytics component 120 and the call handler 110. In addition, depending on the embodiment, the event notifications 240 may include contextual information along with information about the keyword detected by the speech analytics component 120 such as, for example, where in the audio the keyword was detected (e.g., time stamps) and for which call.

Once the call handler 110 receives an event notification 240, the call progress module 210 and/or navigation module 220 perform one or more actions 250 in various embodiments in response to receiving the event notification 240. For example, the event notification 240 may indicate the analytics module 235 detected the keywords "to speak with an operator, press zero" in the audio of the call. Accordingly, the navigation module 220 may interpret this notification 240 to mean the call has reached a menu for an auto attendant and the menu indicates to press zero on a phone device to be forwarded to an operator. Therefore, as a result, the action performed by the navigation module 220 may be to have a "0" DTMF signal sent to reach an operator. In another example, the event notification 240 may indicate the analytics module 235 detected the keywords "please leave a message after the tone" in the audio of the call. Therefore, in this example, the action performed by the navigation module 220 may be to have a message played over the call leg 215 to the called device 102 so that the message can be recorded. Thus, in various embodiments, the navigation module 220 is able to advance the progress of the call by performing different actions based on keywords detected in the audio of the call without having to involve an agent. Other actions may be carried out as detailed below. Furthermore, those skilled in art will recognize FIG. 2 represents one possible configuration of an architecture for using a speech analytics component 120 in conjunction with a call handler 110, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Call Progress Module

Figure 3:
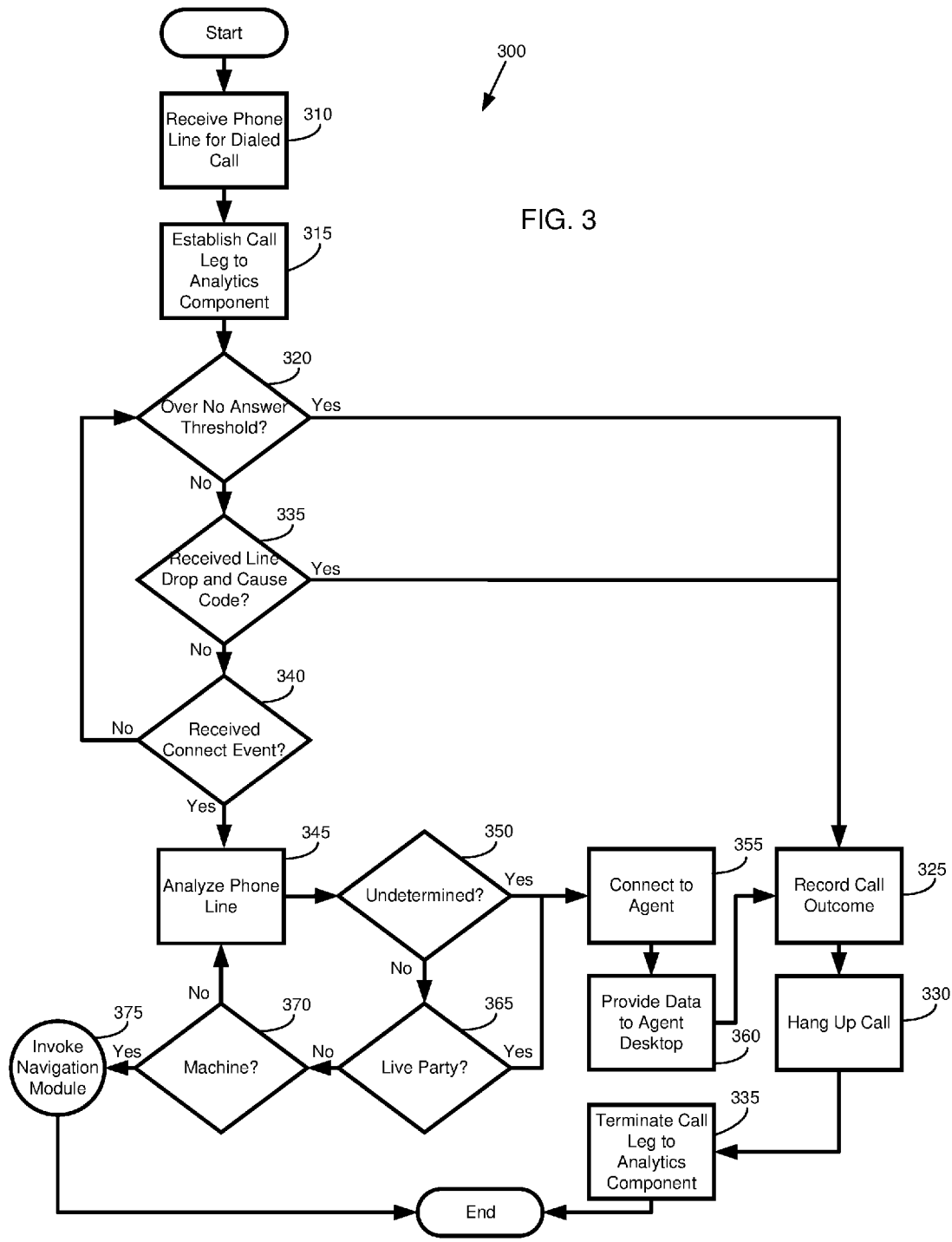
FIG. 3 is a flowchart illustrating a call progress module that can be used in accordance with various embodiments of the present invention.

Turning now to FIG. 3, additional details are provided regarding the process flow for performing a call progress analysis for an outbound call placed to a business according to various embodiments of the invention. In particular, FIG. 3 is a flow diagram showing a call progress module 210 for performing such functionality according to various embodiments of the invention. For example, the flow diagram shown in FIG. 3 may correspond to operations carried out by one or more processors in one or more components, such as, for example, the call handler 110 described above, as it executes the call progress module 210 stored in the component's volatile and/or nonvolatile memory.

Accordingly, the call hander 110 dials a telephone number associated with a business to place an outbound call to the business. In this instance, the telephone number may be a general number that can be called to reach the business such as, for example, a general telephone number that can be found on the business's website. In turn, the call progress module 210 begins the process 300 by receiving a phone line for the dialed outbound call in Operation 310. At this point, the call progress module 210 begins to listen in and analyze the audio received on the phone line to determine an outcome for the call. In addition, in particular embodiments, the call progress module 210 establishes a call leg in Operation 315 to speech analytics component 120. This call leg enables the speech analytics component 120 to monitor the audio provided on the outbound call and detect any keywords spoken by a machine, service, or live party.

A first possible outcome for the call is a no answer condition in which the call continues to ring without someone or something picking up the call. Here, the call progress module 210 is configured to wait a set number of rings before determining the outcome to the call is a no answer. However, with that said, in other embodiments the call progress module 210 may be configured to wait a set duration of time without receiving a connect or disconnect event from the telecommunications provider before reaching a determination that the outcome for the outbound call is a no answer condition.

For example, a ring cadence for a call may be considered to last for two seconds followed by four seconds of silence. Therefore, a single ring for a placed call is expected to last for six seconds. The contact center may set a threshold limit of thirty-six seconds (six rings) for determining the outcome to an outbound call to be a no answer condition. Thus, in this example, the call progress module 210 determines in Operation 320 whether the outbound call has been ringing for over thirty-six seconds without receiving a connect or disconnect event from the telecommunication provider. If so, then the call progress module 210 determines the outcome to the outbound call is a no answer condition. Accordingly, the call progress module 210 then records the call outcome for the call in Operation 325 and hangs up the call in Operation 330. The call progress module 210 may record the determined outcome of the call so that such information may be used for different purposes such as, for example, to help fine-tuning the module. Therefore, additional information may be recorded along with the outcome such as, for instance, information on how the determination was reached for the call. At this point, the call progress module terminates the call leg (if needed) to the speech analytics component 120 in Operation 335.

A second possible outcome for the call is the line is dropped and the call progress module 210 receives a disconnect event from the telecommunication provider. The primary reasons the call progress module 210 may receive such an event from the telecommunication provider is because the telephone number may be busy or the telephone number may be disconnected or inoperable. In addition, the telecommunication provider may provide a cause code along with a disconnect event indicating the reason for the disconnect. For example, a cause code of seventeen may indicate a busy. Thus, the call progress module 210 determines in Operation 335 whether it has received a disconnect event and associated cause code. If so, then similar to determining a no answer condition, the call progress module 210 records the call outcome for the call in Operation 325, hangs up the call in Operation 330, and terminates the call leg (if needed) to the speech analytics component 120 in Operation 335.

Finally, a third possible outcome for the call is the call is connected because a live party, machine, or some service has answered the call. Generally, the telecommunication provider sends the call progress module 210 a connect event indicating the call has been answered. Therefore, the call progress module 210 determines in Operation 340 whether it has received a connect event from the telecommunication provider. If not, then the call progress module 210 returns to Operation 320 and repeats the process again for determining the outcome to the outbound call placed to the business. At some point, the call progress module 210 makes a determination that the call has resulted in a no answer condition, has been dropped, or has been answered.

Therefore, if the call has been answered, the call progress module 210 begin to analyze the phone line to attempt to determine whether a live party or a machine/service has been reached in Operation 345. In various embodiments, the call progress module 210 is configured to perform this particular operation by listening to the cadence of the audio provided on the phone line. That is to say, the call progress module 210 is configured to listen for differences in noise versus non-noise provided in the audio.

Figure 4A:
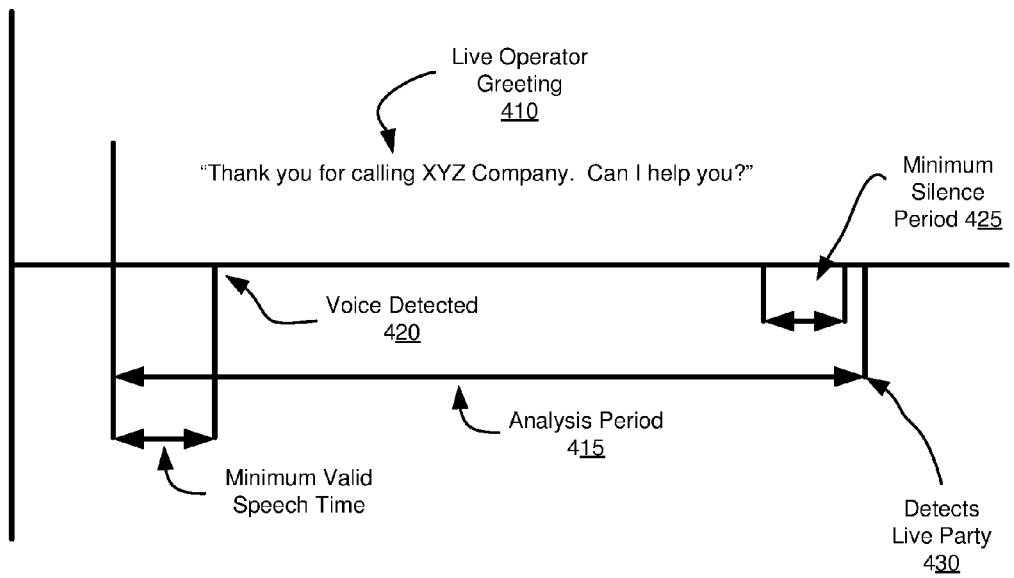
FIGS. 4A and 4B provide diagrams of cadence analysis that can be carried out in accordance with various embodiments of the present invention.

For instance, when a live person answers a telephone call at a business, he or she typically speaks followed by an extended period of silence (non-noise). For example, turning briefly to FIG. 4A, an operator may answer the call by stating "Thank you for calling XYZ Company. Can I help you?" 410 followed by silence. Accordingly, the call progress module 210 is listening to the audio on the call line over the analysis period 415 and detects an initial burst of audio energy (the operator's voice) 420, followed by a minimum silence period 425. This break in cadence is indicative of a live person answering the call, and thus the call progress module 210 concludes the call has been answered by a live party 430 by the end of the analysis period 415.

Figure 4B:
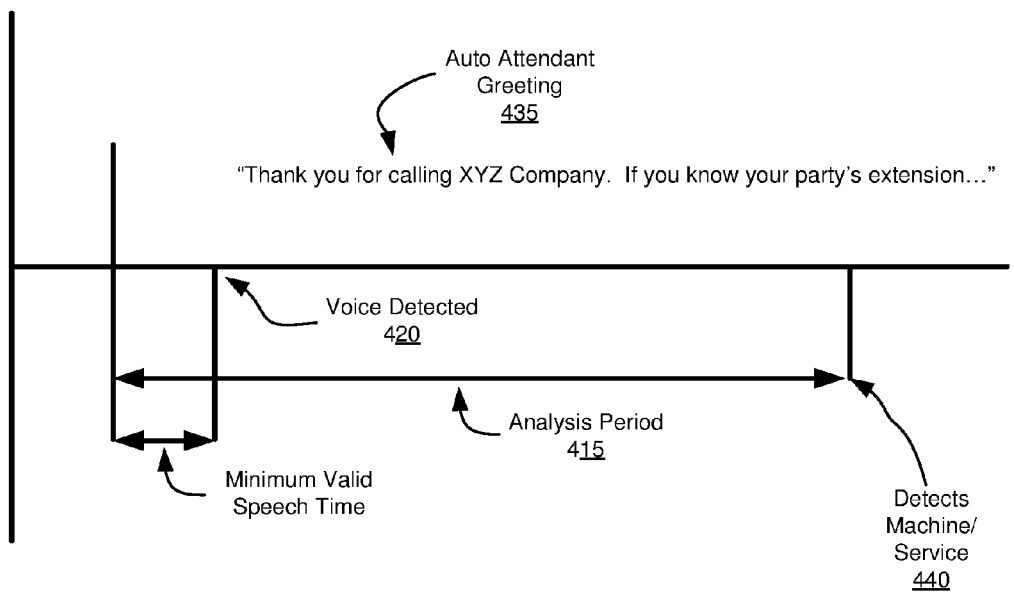

However, when the call progress module 210 encounters a machine such as an auto attendant or a service such as voice mail, the call progress module 210 typically hears an initial burst of audio energy but does not hear an extended period of silence. For example, turning to FIG. 4B, an auto attendant may answer the call by stating "Thank you for calling XYZ Company. If you know your party's extension, you may dial it at any time. Otherwise please select from the following menu items . . . " 435. This time once the call progress module 210 detects the initial burst of audio energy (the auto attendant's electronic voice) 420, the call progress module 210 detects a lack of cadence break over the analysis period 415, and thus concludes the call has been answered by a machine or service 440, and not a live party, by the end of the analysis period 415.

Here, in various embodiments, the analytics carried out by the call progress module 210 is enhanced or modified by information provided by the speech analytics component 120. That is to say, the speech analytics component 120 may be used in various embodiments to help with the call progress module's determination of whether a live party or machine/service has answered the call. Therefore, the call progress module 210 may receive information (events) from the speech analytics component 120 while analyzing the phone line in Operation 345 that can be used to help and/or verify the module's determination of whether a live party or machine/service has answered the call.

For instance, in particular embodiments, the call progress module 210 analyzes the cadence of the audio while at the same time the speech analytics component 120 analyzes the audio to identify keywords being spoken that are typically only spoken by a live party as opposed to a machine or service. Likewise, the speech analytics component 120 may also be able to identify keywords or sounds (e.g., a "beep") that are typically only produced by a machine or service. Accordingly, in these particular embodiments, the speech analytics component 120 can provide information (e.g., an event) to the call progress module 210 when an occurrence of such a keyword is detected. Furthermore, the speech analytics component 120 may be able to identify the sentiment (e.g., an emotion) displayed by words spoken on the call and provide information, accordingly, that may be helpful in identifying whether a call has been answered by a live party or a machine/service.

For example, the call progress module 210 may detect an initial burst of audio energy, followed by four-hundred and fifty milliseconds of silence. In addition, the call progress module 210 may receive an event from the speech analytics component 120 indicating the word "Hello" has been detected. Accordingly, the call progress module 210 may then conclude from the cadence analysis (e.g., an initial burst of audio energy, followed by four-hundred and fifty milliseconds or silence) and the event received from the speech analytics component 120 (e.g., identifying the word "Hello" has been detected) that the call has reached a live party with increased confidence. Thus, in particular embodiments, the call progress module 210 can use information (events) received from the speech analytics component 120 to either verify the module's determination based on analyzing the cadence of the audio on the call or to make the determination solely on the information provided by the speech analytics component 120 instead of analyzing the cadence of the audio on the call.

However, with that said, other configurations may be used in other embodiments. For instance, the call progress module 210 may be configured in particular embodiments to accept the first determination that the call has been answered by a live party or machine/service, regardless of whether the first determination is made based on cadence analysis or an event (keyword detection) received from the speech analytics component 120. While in other embodiments, the call progress module 210 may consider a confidence value associated with the cadence analysis and/or the event (the keyword detection) in deciding whether to accept a particular determination or deciding which of the determinations to accept.

Finally, it is noted that in particular embodiments the call progress module 210 may also consider the call history associated with a particular telephone number while analyzing the phone line to further bolster the call progress module's confidence in determining whether a call placed to the number has reached a live party or a machine/service. For instance, the call history for a particular telephone number may indicate that the last time a call was placed to the number, the call was answered by a live party. Therefore, in this instance, if cadence for the current call and/or an event received from the speech analytics component 120 indicates a live party has been reached and the call history indicates the last call placed to the number was answered by a live party, then the call progress module 210 can determine with a high degree of confidence that the current call has also reached a live party. The opposite may be applicable as well. For instance, if cadence for the current call and/or an event received from the speech analytics component 120 indicates a live party has been reached and the call history indicates the last call placed to the number was answered by an auto attendant, then the call progress module 210 may be configured to perform other verification operations (e.g., conduct further cadence analysis) before reaching a determination as to whether the call has reached a live party or machine/service. It is noted that call history may also be used in various embodiments with respect to other determinations made by the call progress module 210 such as, for example, determining whether menu options and/or a voice mail service has been reached.

Therefore, returning to FIG. 3, the call progress module 210 analyzes the phone line in Operation 345 and first makes a determination in Operation 350 as to whether it is undeterminable whether the call has reached a live party or a machine. If so, then the call progress module 210 may handle the call in different ways depending on the embodiment. For instance, in FIG. 3, the call progress module 210 is configured to still connect the call to an agent in Operation 355. Here, the contact center considers it important to have an agent handle the call if the call progress module 210 is unable to determine whether the call has reached a live party or machine so that the contact center does not miss out on an opportunity to interact and speak with a live party at the business if the call has in fact reached a live party. In other instances, the contact center may consider agent's time (productivity of agents) to be of more importance over potentially missing some opportunities to speak with live parties and may only connect an agent to a call when the call progress module 210 has made a positive determination that the call has reached a live party. In these instances, the contact center may handle undetermined calls differently such as, for example, playing a recorded message over the call explaining why the call was placed to the business and providing information for returning a call to the contact center.

Secondly, the call progress module 210 determines whether the call has reached a live party in Operation 365. If so, then the module 210 connects the call with an agent in Operation 355. In addition, the call progress module 210 provides data to the agent's desktop who is fielding the call in Operation 360. For instance, the call progress module 210 may provide an indication that the call has reached a live party so that the agent is aware of what actions he may be required to take with respect to the call. In addition, the call progress module 210 may provide the agent with information on the business and/or individual that has been contacted that may prove helpful to the agent in fielding the call. Such information may be gathered from different sources depending on the embodiment. For example, the contact center may make use of a customer relationship management system ("CRM") to organize information for different customers and customer prospects.

Lastly, the call progress module 210 determines whether the call has reached a machine in Operation 370. If so, then the call progress module 210 invokes the navigation module 220 in Operation 375. As discussed in greater detail below, the navigation module 220 is configured to handle navigating a call that has reached some type of machine or service (e.g., auto attendant or voice mail) to a live party or some other type of desired end, such as leaving a voice mail message, without having to involve an agent during the navigation process. At this point, the call progress module 210 ends the process 300.

Navigation Module

Figure 5:
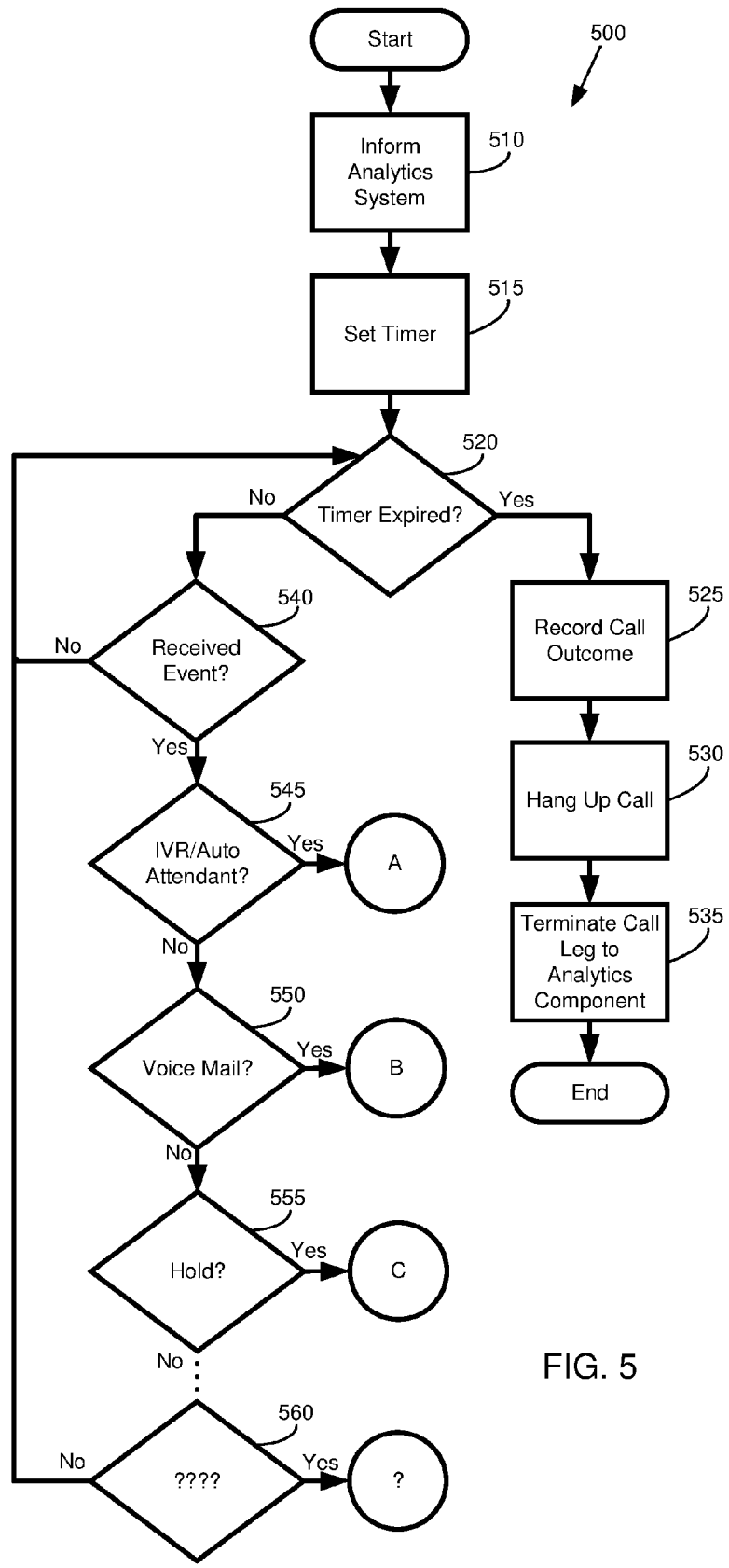

Turning now to FIG. 5, additional details are provided regarding the process flow for navigating an outbound call that has reached a machine/service according to various embodiments of the invention. In particular, FIG. 5 is a flow diagram showing a navigation module 220 for performing such functionality according to various embodiments of the invention. For example, the flow diagram shown in FIG. 5 may correspond to operations carried out by one or more processors in one or more components, such as, for example, the call handler 110 described above, as it executes the navigation module 220 stored in the component's volatile and/or nonvolatile memory.

The process 500 begins with the navigation module 220 informing the speech analytics component 120 that the module is ready to receive any events sent for the call in Operation 510. Thus, in particular embodiments, the navigation module 220 may provide the speech analytics component 120 with information such as an identifier for the call so that the speech analytics component 120 is aware of which call the speech analytics component 120 should send the events for to the navigation module 220.

Continuing on, the navigation module 220 sets a timer in Operation 515. Here, the timer (e.g., a time threshold) is used as a mechanism to measure the amount of time the navigation module 220 spends in attempting to advance the progress of the call. Such a timer helps to ensure the navigation module 220 is not simply monitoring a call for too long without reaching a conclusion to the call. Thus, in Operation 520, the navigation module 220 determines whether the timer has expired. Since this is the first time the module 220 is checking the timer upon setting it, the navigation module 220 determines the timer has not expired.

At this point, the navigation module 220 determines in Operation 540 whether it has received any event notifications from the speech analytics component 120 indicating a keyword has been detected. As is discussed in greater detail below, the speech analytics component 120 listens in on the audio of the call to identify when any keywords are spoken by the machine or service (or lack thereof). These keywords help to identify what type of machine or service is currently handling the call and what may be required by such a machine or service. For example, an auto attendant may be currently handling the call and may indicate "to speak with an operator, press zero." In this instance, this phrase may be defined as a keyword and accordingly, the speech analytics component 120 may detect the presence of the keyword in the audio on the call and send an event (e.g., an event notification) to the navigation module 220 indicating to the module 220 that the call has reached an auto attendant and that it should provide a "0" DTMF signal to attempt to reach an operator on the call.

Therefore, in various embodiments, the navigation module 220 is configured to handle different types of events provided by the speech analytics component 120 for different situations. One such event is when the call reaches an IVR/auto attendant. For example, the speech analytics component 120 may detect audio on the call that states "welcome to . . . " or "for English . . . " and send the navigation module 220 an event identifying the detected audio. In turn, the navigation module 220 may receive the event and determine from the information provided in the event that the call has reached an IVR/auto attendant.

For instance, in particular embodiments, the contact center may build one or more library of keywords that are used to identify different situations encountered during the call. For example, the contact center may build a library of keywords that includes the terms "welcome to" and "for English" that can be used to identify a situation in which the call has reached an IVR/auto attendant. Accordingly, the speech analytics component 120 listens in on the call and listens for occurrences of the keywords found in the library. If the speech analytics component 120 detects a keyword from the library in the audio for the call, then the speech analytics component 120 sends an event identifying the detection of the keyword to the navigation module 220.

The event may include different types of information depending on the embodiment. For instance, in one embodiment, the event may simply identify the keyword detected by the speech analytics component 120 and the navigation module 220, in turn, would relate this identified keyword to the call reaching an IVR/auto attendant. While in another embodiment, the speech analytics component 120 may indicate in the event that the call has reached an IVR/auto attendant and an action that should be taken, with or without identifying the keyword that was detected in the audio. Furthermore, the speech analytics component 120 may include additional information to identify the particular call associated with the event.

Thus, in Operation 545, the navigation module 220 determines whether the call has reached an IVR/auto attendant. If so, then the navigation module 220 continues on to A that involves processes 600A, 600A1, 600A2, 600A3, 600A4 shown in FIGS. 6A, 6A1, 6A2, 6A3, and 6A4 for further handling a call that has reached an IVR/auto attendant. Likewise, in Operation 550, the navigation module 220 determines whether the call has reached voice mail. Again, if so, then the navigation module 220 continues on to a B that involves a process 600B shown in FIG. 6B for further handling a call that has reached voice mail. Finally, in Operation 555, the navigation module 220 determines whether the call has reached a point where it has been placed on hold. If so, then the navigation module 220 continues on to C that involves a process 600C shown in FIG. 6C for handling a call that has been placed on hold.

It should be noted that in other embodiments, additional situations may be addressed by the process 500 shown in FIG. 5. That is to say, the process 500 shown in FIG. 5 may be modified to handle events received for other situations as a contact center sees fit besides the call reaching an IVR/auto attendant, voice mail, or being placed on hold. Accordingly, such a capability is shown in FIG. 5 by the process flow continuing on to Operation 560, representing any additional situation(s) the contact center may wish to capture that the call may have reached.

The process 500 continues as shown in FIG. 5 until an event is received for one of the situations that is to be identified by the navigation module 220 or until the timer expires in Operation 520. If the timer expires prior to the navigation module 220 identifying one of the situations (e.g., the call reaching an IVR/auto attendant, voice mail, or being placed on hold), then the navigation module 220 continues to Operation 525 and records the outcome to the call. At this point, the navigation module hangs up the call in Operation 530 and terminates the call leg from the call to the voice analytics system 120 in Operation 535.

Figure 6A:
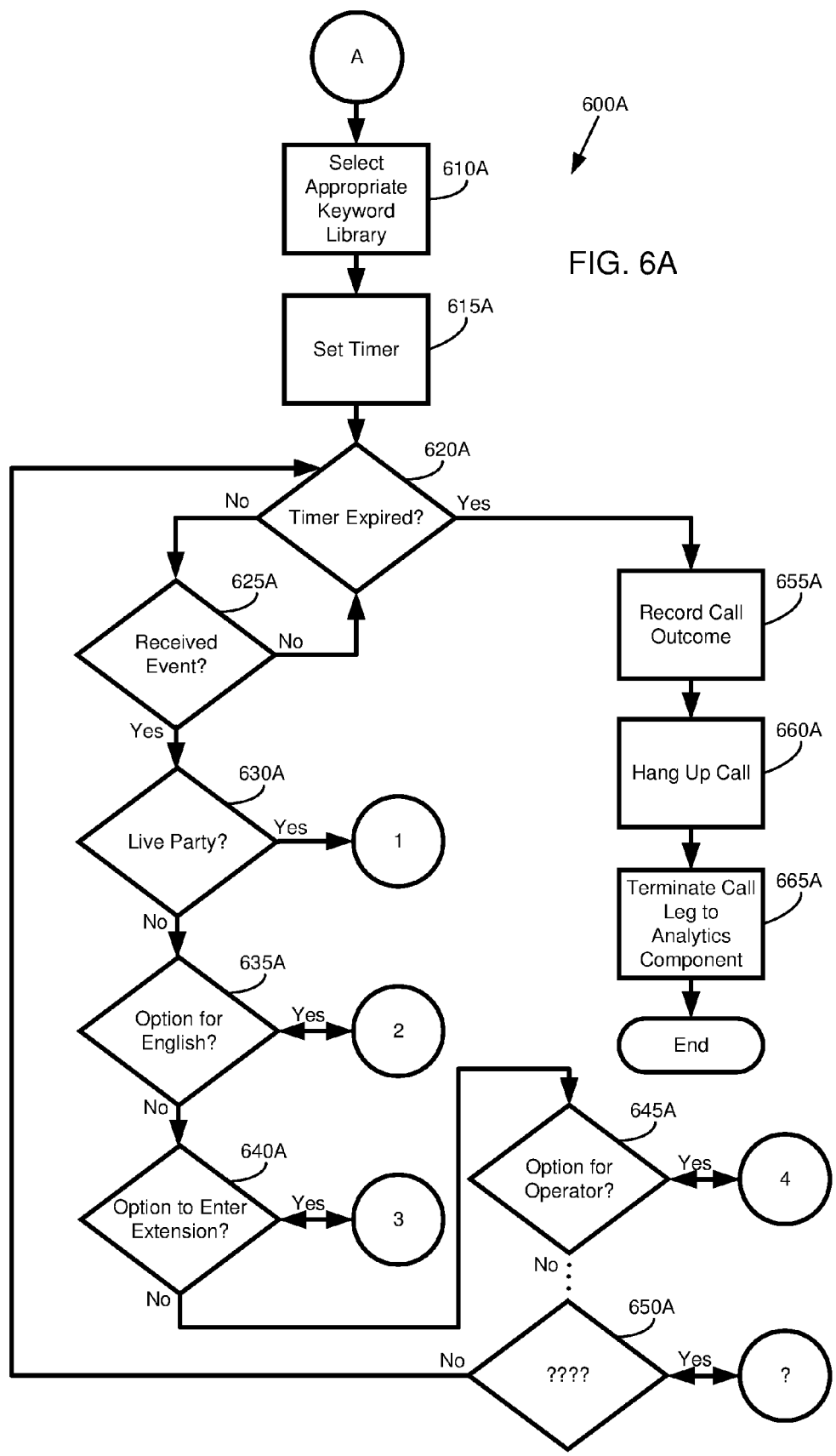

Turning now to FIG. 6A, the process 600A shown in this figure lays out the operations carried out by the navigation module 220 when the module 220 determines the call has reached an IVR/auto attendant accordingly to various embodiments. Here, the process 600A begins with the navigation module 220 selecting the appropriate keyword library in Operation 610A. For instance, in particular embodiments, the navigation module 220 sends a request to the speech analytics component 120 to begin using a keyword library that includes keywords to listen for that are associated with a call reaching an IVR/auto attendant. For example, an IVR/auto attendant may be currently handling a call and may provide a menu of options for a caller to choose from. Here, the keyword library used by the speech analytics component 120 may include the keyword "to speak with an operator, press zero" that represents an option from the menu. Accordingly, in this example, the speech analytics component 120 would send an event to the navigation module 220 whenever this particular keyword is detected in the audio of the call so that the navigation module 220 can send a DTMF signal to select the option if so desired.

Continuing on, the navigation module 220 sets a timer in Operation 615A. Similar to the previous timer set by the navigation module 220, this timer is set to ensure the navigation module 220 does not encounter a situation in which none of the keywords (e.g., the options) found in the library are detected by the speech analytics component (provided by the IVR/auto attendant) and the module 220 just simply sits, waiting for an event. Thus, in Operation 620A, the navigation module 220 determines whether the timer has expired. Accordingly, the timer may be set to some threshold amount of time by the contact center.

If the timer has not expired, then the navigation module 220 determines whether it has received an event from the speech analytics component 120 in Operation 625A. If not, the navigation module 220 returns to Operation 620A to check the timer again. However, if the navigation module 220 has received an event, then the navigation module 220 runs through one or more operations based on the event to determine how to further proceed.

Here, the navigation module 220 first determines whether the call has reached a live party in Operation 630A. For instance, the IVR/auto attendant may have first provided an option to enter a zero to reach an operator and the speech analytics component 120 may have provided the navigation module 220 with an event indicating such. In response, the navigation module 220 may have sent a DTMF signal for a zero so as to try and reach the operator. Accordingly, when the operator comes onto the line for the call, the speech analytics may detect a keyword from the operator's greeting "Hello, thank you for calling XYZ Company. May I help you?" and send an event to the navigation module 220 indicating such. Therefore, returning to FIG. 6A, the navigation module 220 may determine at Operation 630A that the call has now reached a live party.

Turning briefly to FIG. 6A1, a process 600A1 carried by navigation module 220 is shown when the module 220 determines a call has reached a live party according to various embodiments. In this instance, the navigation module 220 connects the call to an agent in Operation 610A1. In addition, the navigation module 220 provides information on the agent's desktop indicating the call has reached a live party in Operation 615A1. For instance, returning to the example, the navigation module 220 provides information on the agent's desktop informing the agent that the call has reached an operator. Next, the navigation module 220 records the outcome to the call in Operation 620A1. Finally, the navigation module 220 terminates the call leg from the call to the speech analytics component 120 in Operation 625A1 since the call has reached a live party and no longer needs to be monitored by the speech analytics component 120.

Returning to FIG. 6A, the navigation module 220 next determines whether the IVR/auto attendant has provided an option to continue in English in Operation 635A. Thus, turning briefly to FIG. 6A2, if the navigation module 220 determines the received event is for this option, then the navigation module 220 carries out a process 600A2 to send a DTMF signal to select the option in Operation 610A2. At this point, the navigation module returns to the process flow shown in FIG. 6A in Operation 615A2.

Another option the IVR/auto attendant may provide is to enter a party's extension at any time if it is known. This option may be provided at the beginning of the IVR/auto attendant's announcement or further along in the announcement. For example, the auto attendant may state "Thank you for calling XYZ Company. If you know your party's extension, you may dial it at any time or select from the following menu options . . . ." Here, the option to dial a party's extension is provided very close to the beginning of the announcement. However, in another example, the auto attendant may state "Thank you for calling XYZ Company. Please select from the following menu options . . . for sales, press one . . . or to speak with an operator, press zero. You may also dial a party's extension at any time." Here, the option to dial a party's extension is provide much further along in the announcement after the menu options have been provided.

Accordingly, the navigation module 220 determines whether the IVR/auto attendant has provided an option to enter a telephone extension in Operation 640A. Here, if the navigation module 220 determines this option has been provided from the received event, then turning to FIG. 6A3, the navigation module 220 performs a process 600A3 that first involves the module 220 looking up an extension in Operation 610A3. For instance, in particular embodiments, the navigation module 220 may access information on the business that was called from a source such as a CRM to determine whether the contact center has a particular contact at the business the center wishes to speak with and an extension for the contact. Thus, the navigation module 220 determines whether the contact center has such a telephone extension in Operation 615A3. If so, then the navigation module 220 sends the DTMF signals for the extension in Operation 620A3 and returns to the process flow shown in FIG. 6A in Operation 625A3.

Continuing on, another option the IVR/auto attendant may provide is the option to speak with an operator. Here, the navigation module 220 determines whether this option has been provided in Operation 645A. Turning briefly to FIG. 6A4, a process 600A4 is shown that is carried out by the navigation module 220 when this option is provided according to various embodiments. Depending on the circumstances, the contact center may be placing a call just generally to the business (such as a cold call) or may be placing a call to a particular contact at the business. In most instances, if the contact center knows a particular contact at the business and also knows his or her telephone extension, then the contact center is more likely to want to use the option to enter the contact's extension rather than trying another option such as reaching an operator first and then being connected to the contact. Therefore, the process 600A4 shown in FIG. 6A4 has the navigation module 220 first check to determine whether the contact center has a telephone extension for a particular contact at the business and is provided with an option to enter the extension before taking steps to try and reach an operator.

Accordingly, the navigation module 220 performs a look up (e.g., in a CRM) for an extension to a particular contact in Operation 610A4 and then makes a determination on whether the contact center has such an extension in Operation 615A4. If the navigation module 220 determines the contact center does have such an extension, then the navigation module 220 waits for a period of time (e.g., five seconds) in Operation 620A4 to ensure that an option to enter the extension is not given at a later time in the announcement before taking the step of entering the menu option to reach an operator.

After the navigation module 220 has waited the period of time, the navigation module 220 determines whether it has received a new event from the speech analytics component 120 in Operation 625A4. If so, then the navigation module 220 returns to the process 600A shown in FIG. 6A. However, if the navigation module 220 has not received a new event, then the module 220 sends the appropriate DTMF signal (e.g., "0") for the option in Operation 630A4, helping to advance the call by attempting to reach an operator. The navigation module then returns to the process 600A shown in FIG. 6A at Operation 635A4.

Here again, the navigation module 220 may be configured to address additional situations using the process 600A shown in FIG. 6A when the call has reached an IVR/auto attendant. That is to say, the process 600A shown in FIG. 6A may be modified to handle events received for other situations as a contact center sees fit besides the call reaching an IVR/auto attendant and being provided with the options to select English, enter an extension, and/or speak with an operator. Accordingly, such a capability is shown in FIG. 6A by the process flow continuing on to Operation 650A, representing any additional situation(s) the contact center may wish to capture for options provided by the IVR/auto attendant.

Accordingly, after performing the appropriate operations for an event received from the speech analytics component 120, the navigation module 220 returns to Operation 620A to determine whether the timer has expired and if not, continues with the operations already discussed above. If not, then the navigation module 220 returns to Operation 625A to wait to receive another event from the speech analytics component 120. However, if the timer has expired, then the navigation module 220 records the outcome to the call in Operation 655A. The navigation module 220 then hangs up the call in Operation 660A and terminates the call leg from the call to the speech analytics component in Operation 665A.

Figure 6B:
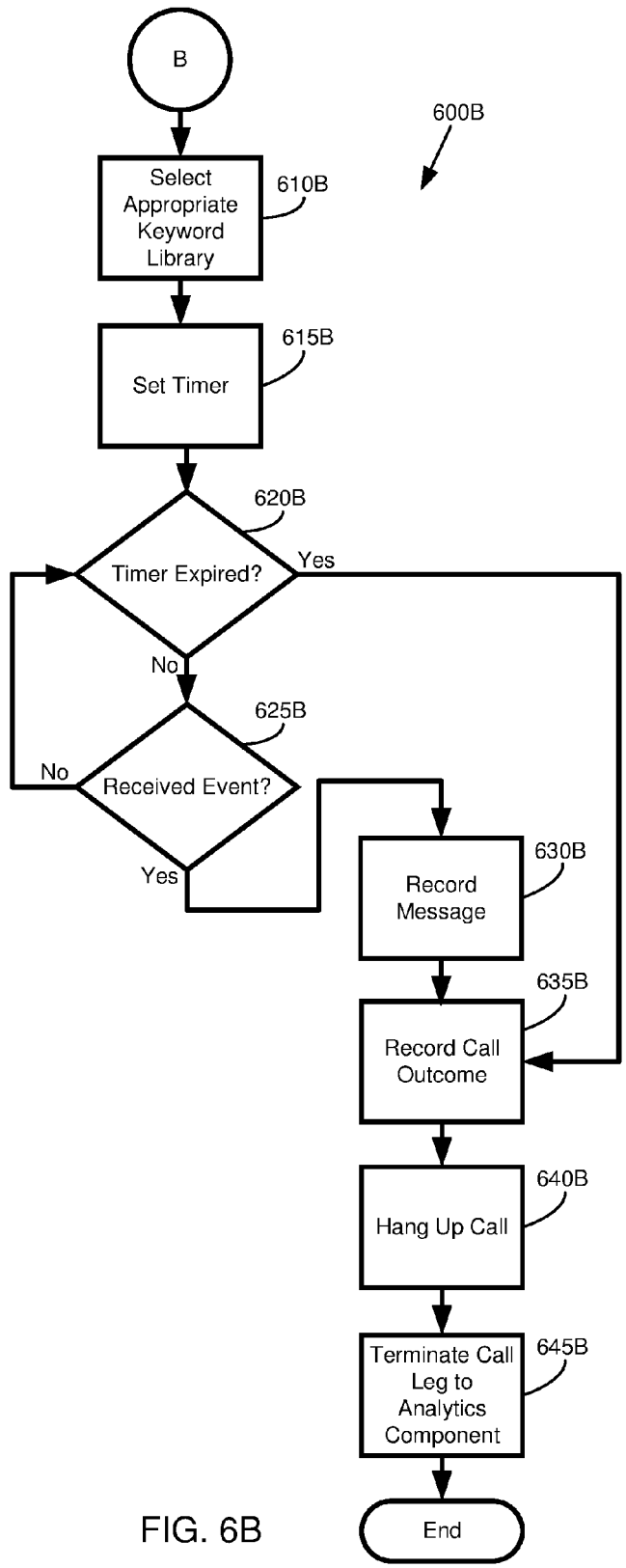

Turning now to FIG. 6B, the process 600B shown in this figure lays out the operations carried out by the navigation module 220 when the module 220 determines the call has reached voice mail (or an answering machine) accordingly to various embodiments. Again, the navigation module 220 begins the process 600B by selecting the appropriate keyword library for the speech analytics component 120 to use for this situation in Operation 610B. For example, in this particular instance, the contact center may construct a library to include phrases such as "please leave a message after the . . . " as keywords to help the speech analytics component 120 and navigation module 220 make a determination when a message should be left on a voice mail. In some instance, the speech analytics component 120 may also (or instead of) be configured to recognize a "beep."

Again, the navigation module 220 sets a timer in Operation 615B to ensure the module does not get trapped in a situation in which it is waiting to receive an event from the speech analytics component 120, however the component 120 fails to ever send an event because it does not detect a keyword from the appropriate library in the audio. Accordingly, in Operation 620B, the navigation module 220 determines whether the timer has expired.

Continuing on, if the timer has not expired, the navigation module 220 determines if it has received an event from the speech analytics component 120 in Operation 625B. In this instance, the navigation module 220 should only receive an event from the speech analytics component 120 when the component 120 has detected an instance when a message can be left on the voice mail. Therefore, in this embodiment of the process 600B, the navigation module 220 records a message on the voice mail in Operation 630B upon receiving an event from the speech analytics component 120.

It is noted that although not shown in FIG. 6B, the navigation module 220 may be configured in particular embodiments to leave a specific type of message depending on the circumstances. For instance, the call could have reached a general voice mail for the company that has been called or could have reached a voice mail for a specific contact if an extension for the contact has been entered. Therefore, the navigation module 220 may first determine which message to record in Operation 630B before playing the message to record on the voice mail. For example, if the navigation module 220 previously entered an extension for a contact at the business, then the navigation module 220 may have set some type of indicator that the extension was entered. Therefore, in this example, the navigation module 220 may first reference the indicator and determine that a contact's voice mail has been reached as opposed to a general voice mail for the business and as a result, record a particular (more personalized) message on the contact's voice mail in Operation 630B.

Further, although not shown in FIG. 6B, the navigation module 220 may be configured in particular embodiments to perform different operations depending on the circumstances. Again, returning to an instance where the navigation module 220 may reach a general voice mail for the business or a contact's individual voice mail, the navigation module 220 may be configured to leave a pre-recorded message on a general voice mail for the business. However, the navigation module 220 may be configured to forward the call to an agent to leave a more personalized message on a contact's personal voice mail. Those of ordinary skill in the art can envision other configurations of the process 600B carried out by the navigation module 220 when a call has reached a voice mail in light of this disclosure.

After recording the message, the navigation module 220 records the outcome of the call in Operation 635B and hangs up the call in Operation 640B. The navigation module 220 then terminates the call leg from the call to the speech analytics component 120 in Operation 645B.

Figure 6C:
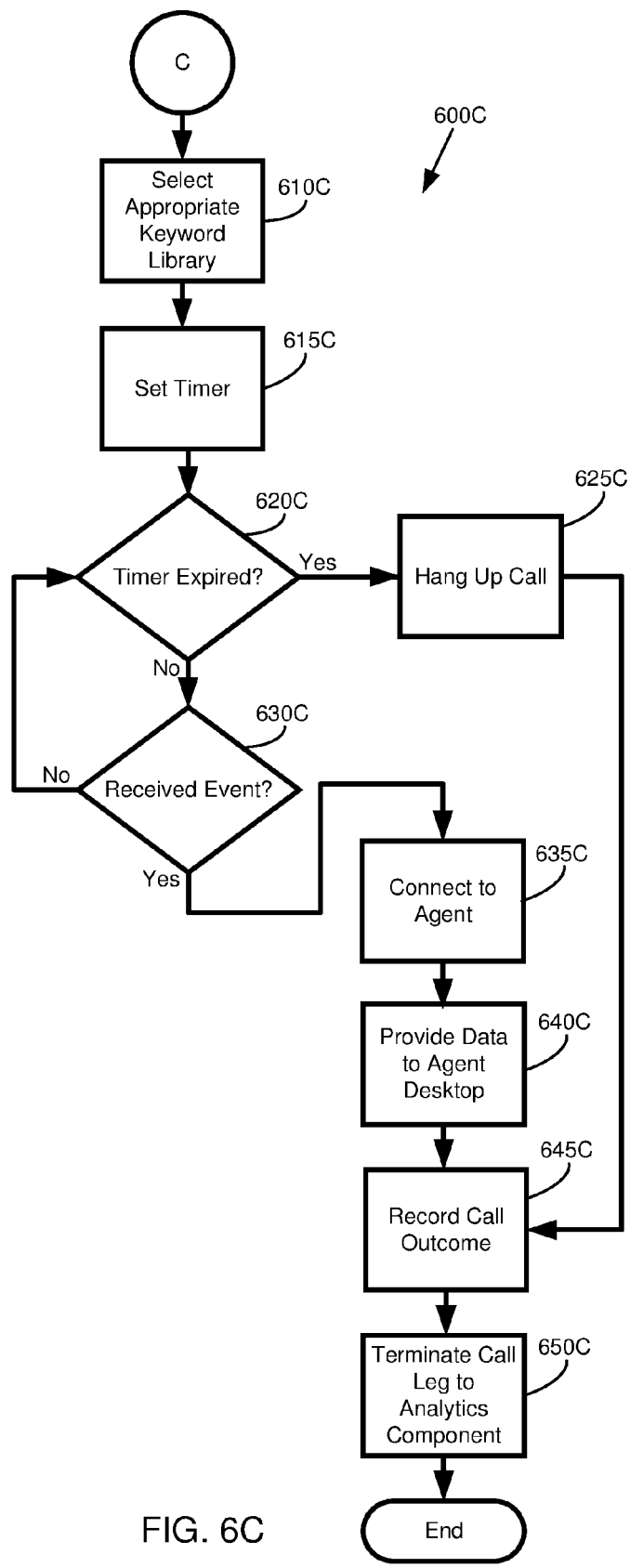

Finally, turning now to FIG. 6C, the process 600C shown in this figure lays out the operations carried out by the navigation module 220 when the module 220 determines the call has been placed on hold accordingly to various embodiments. Again, the navigation module 220 selects the appropriate keyword library for the speech analytics component 120 to use in Operation 610C. Here, the keyword library includes keywords that indicate when the call is being taken out of hold and forwarded to a live party such as, for example, "hello, this is . . . , may I help you?"

Also, again, the navigation module 220 sets a timer in Operation 615C to ensure the module 220 does not get trapped by never receiving an event from the speech analytics component 120 or by just simply sitting on hold for too long. Accordingly, the navigation module 220 determines whether the timer has expired in Operation 620C. If so, then the navigation module 220 hangs up the call in Operation 625C and records the outcome of the call in 645C. The navigation module 220 then terminates the call leg to the speech analytics component 120 in Operation 650C.

However, if the timer has not expired, then the navigation module 220 determines whether an event has been received from the speech analytics component 120 in Operation 630C. If such an event has been received, then the event signals the call has been taken out of hold and connected to a live party. Accordingly, if an event has been received, the navigation module 220 connects the call to an agent in Operation 635C and provides information on the agent's desktop in Operation 640C informing the agent the call has been forwarded to a live party. At this point, the navigation module 220 records the outcome to the call in Operation 645C and terminates the call leg to the speech analytics component 120 in Operation 650C.

Analytics Module

Figure 7:
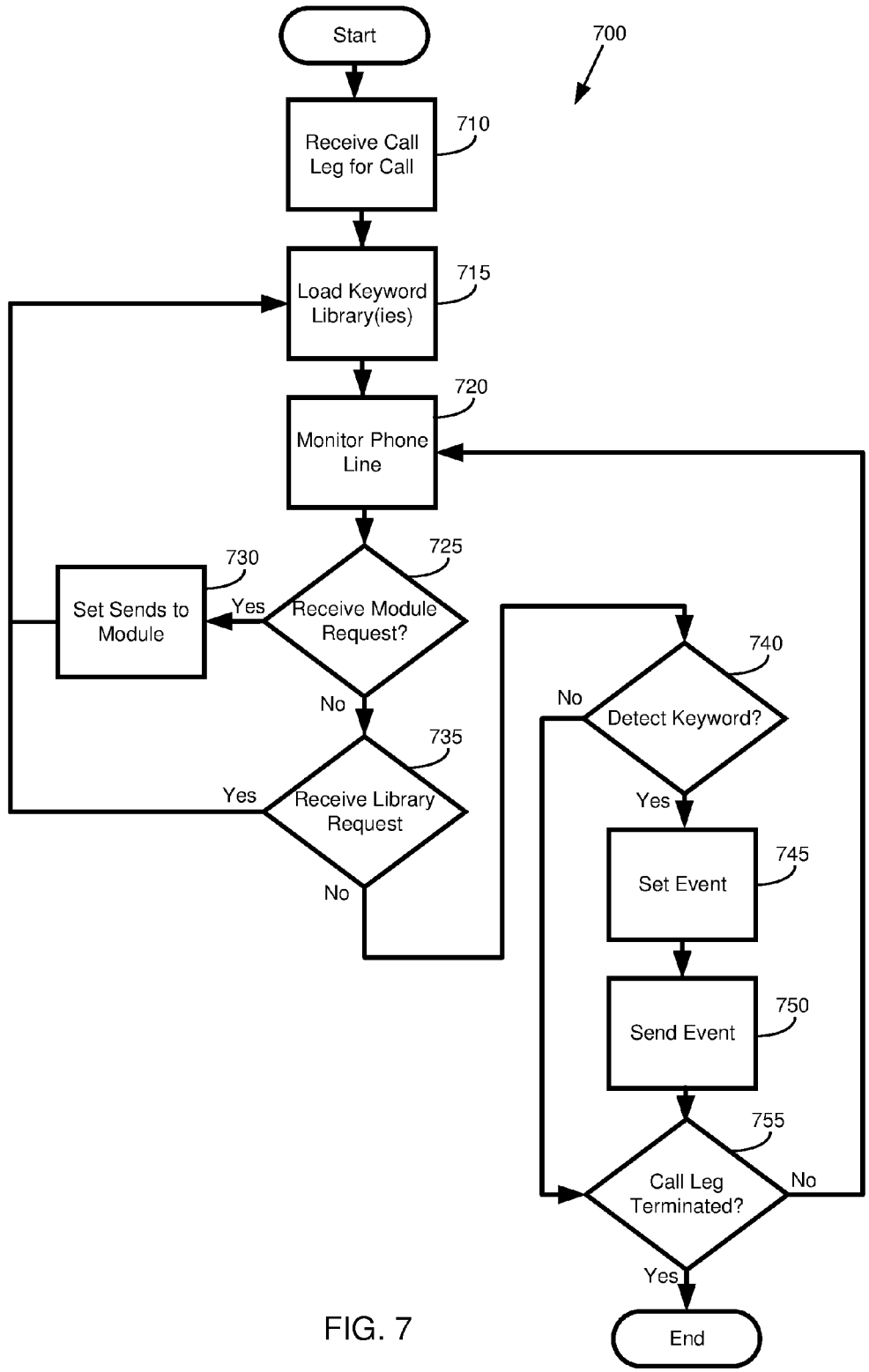
FIG. 7 is a flowchart illustrating an analytics module that can be used in accordance with various embodiments of the present invention.

Turning now to FIG. 7, additional details are provided regarding the process flow for identifying a keyword spoken in the audio of an outbound call according to various embodiments of the invention. In particular, FIG. 7 is a flow diagram showing an analytics module 235 for performing such functionality according to various embodiments of the invention. For example, the flow diagram shown in FIG. 7 may correspond to operations carried out by one or more processors in one or more components, such as, for example, the speech analytics component 120 described above, as it executes the analytics module 235 stored in the component's volatile and/or nonvolatile memory.

As already discussed above, the call progress module 210 establishes a call leg to the speech analytics component 120 so that the component 120 can monitor the audio provided on the outbound call and detect any keywords spoken by a machine, service, or live party. Thus, the process 700 begins in FIG. 7 with the analytics module 235 receiving the call leg for the call in Operation 710. Here, the analytics module 235 loads the appropriate keyword library(ies) in Operation 715. These library(ies) may be stored in some type of structure such as a database or file that is accessible by the analytics module 235. Accordingly, the appropriate keyword library (ies) include the keywords the analytics module 235 is interested in detecting in the audio of the call depending on the current circumstances the call is encountering. For instance, if the call has encountered an IVR/auto attendant, then the analytics module 235 would load the keyword library(ies) associated with options that may be provided by the IVR/auto attendant on the call. At this point, the analytics module 235 begins to monitor the audio on the phone line for the call in Operation 720.

Next, the analytics module 235 determines whether it has received a request from a module to have events sent to the module for a particular call in Operation 725. For instance, the call progress module 210 may be receiving events from the analytics module 235 for a call in an attempt to determine whether the call has reached a live party or a machine/service. Here, the call progress module 210 may determine the call has reached a machine and accordingly, invokes the navigation module 220. As a result, the navigation module 220 may then send a request to the analytics module 235 to have events for the call sent to the navigation module 220. Therefore, if the analytics module 235 determines it has received such a request in Operation 725, then the analytics module 235 sets to have events sent to the navigation module 220 in Operation 730.

Furthermore, the analytics module 235 determines whether it has received a request to have one or more particular libraries loaded in Operation 735. For instance, as the call progresses, the call may encounter a new situation that requires the analytics module 235 to begin monitoring the audio of the call for a different set of keywords than what the analytics module 235 is currently monitoring for.

For example, the analytics module 235 may be monitoring the audio of the call for keywords indicating whether the call has reached a live party or a machine. These keywords may be found in a first library. However, it may be determined that the call has reached a machine, specifically an IVR/auto attendant, and therefore the analytics module 235 does not need to continue to monitor for the keywords found in the first library, but now needs to monitor keywords associated with the call reaching the IVR/auto attendant and found in a second library. Therefore, the analytics module 235 may receive a request from the navigation module 220 to load the second library. If such a request is received, then the analytics module 235 returns to Operation 715 and loads the requested library(ies).

Figure 8:
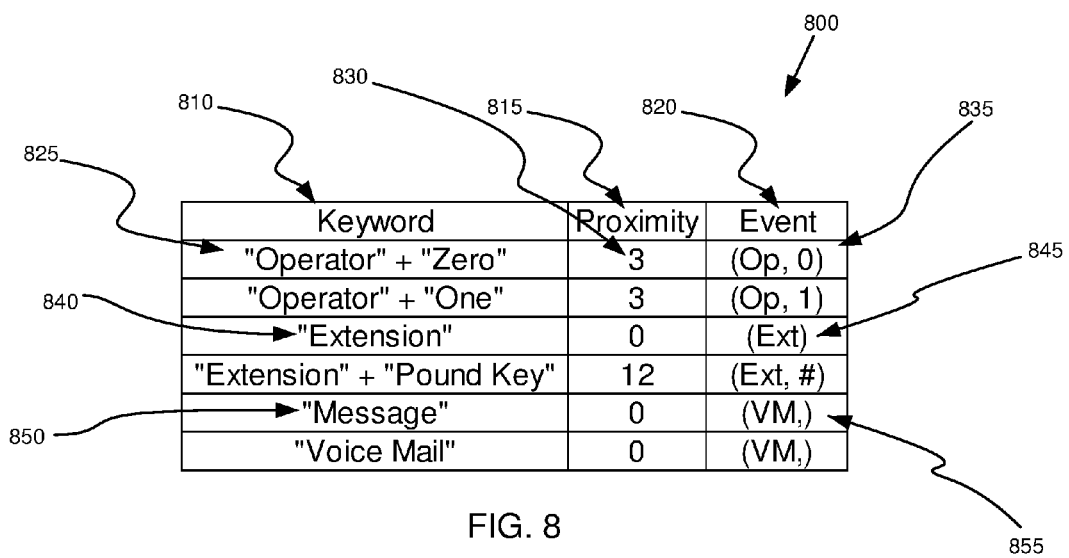
FIG. 8 shows a table providing a sample of a library of keywords that can be used in accordance with various embodiments of the present invention.

At Operation 740, the analytics module 235 determines whether a keyword has been detected. If a keyword is detected at Operation 740, then the analytics module 235 sets an event for the detected keyword in Operation 745. The analytics module 235 may carry out this operation by performing various steps depending on the embodiment. For instance, turning briefly to FIG. 8, this figure shows a table 800 providing a sample of a library of keywords. It should be noted that this table 800 is provided for illustrative purposes only and should not be construed to limit the scope of the invention. Here, the table provides a first column 810 listing the keywords the analytics module 235 is to detect while listening in on the audio of the call. For example, one of the keywords is "Operator"+"Zero" 825. In this instance, the analytics module 235 is to detect any occurrence in the audio of the term "Operator" followed by the term "Zero."

The next column 815 in the table 800 provides the proximity the terms that make up the keyword must be from one another. For instance, returning to the example of the keyword "Operator"+"Zero" 825, the proximity these two words must be from one another is three 830. Therefore, if the analytics module 235 detects the statement "to speak with an operator, press zero," then the analytics module 235 would recognize this as an occurrence of a keyword since the terms "operator" and "zero" in the statement are only separated by a single word.

Finally, the last column 820 in the table 800 provides the event the analytics module 235 is to send upon detecting the corresponding keyword. Again, returning to the example of the keyword "Operator"+"Zero" 825, the analytics module 235 sends the event (Op, 0) 835 upon detecting this keyword. Here, "Op" indicates that the event is for a menu selection to reach an operator and "0" indicates the DTMF signal the navigation module 220 is to provide on the call to select the associated menu item and attempt to reach an operator.

As for other keywords shown in the table 800, the keyword "Extension" 840 indicates an instance in which an option to enter a party's extension is encountered. Here, the analytics module 235 sends the event (Ext) 845 to the navigation module 220 so that the module 220 knows to enter an extension for a party if known to further advance the call. Likewise, the keyword "Message" 850 indicates an instance in which the contact center has been requested to leave a message. Accordingly, the analytics module 230 sends the event (VM) 855 to the navigation module 220 so that the module 220 knows to record a message for the call. As one of ordinary skill in the art can gather from reading this disclosure, other keywords and events can be defined to address numerous situations that may occur during a call.

Returning now to FIG. 7, once the analytics module 235 has set the event in Operation 745, then the analytics module 235 sends the event to the call progress and/or navigation modules 210, 220 in Operation 750. Accordingly, the call progress and/or navigation modules 210, 220 process the event as already discussed in detail above. At this point, the analytics module 235 determines in Operation 755 whether the call leg to the call has been terminated. If not, then the analytics module 235 returns to Operation 720 and continues to monitor the phone line. If instead the call leg has been terminated, then the analytics module 235 stops monitoring the phone line for the call.

Exemplary Processing Device Architecture

Figure 9:
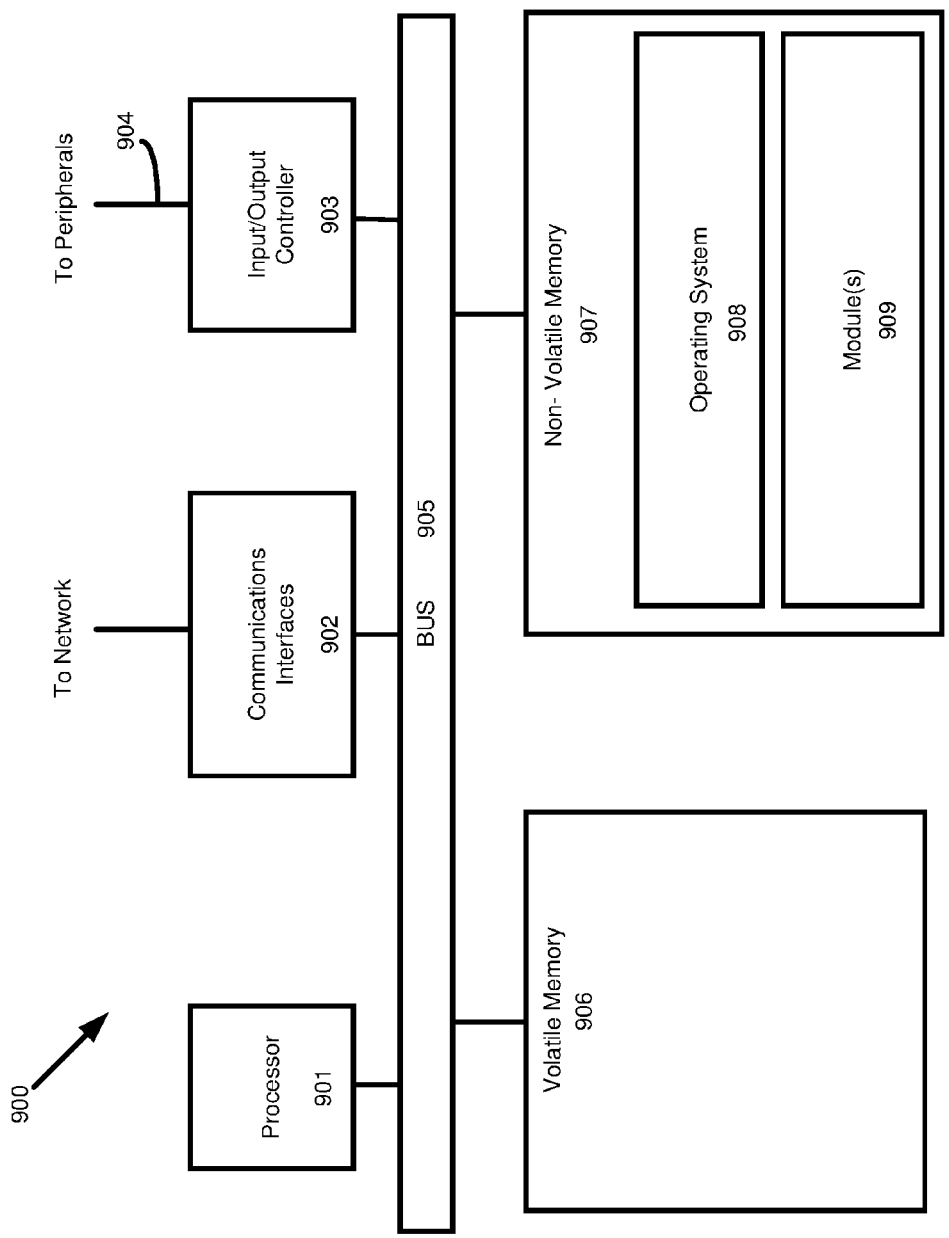
FIG. 9 is an exemplary schematic diagram of a server used in one embodiment of the contact center architecture to practice the technologies disclosed herein.

As discussed in conjunction with FIG. 1, the contact center architecture 100 may comprise various components. Accordingly, FIG. 9 is an exemplary schematic diagram of a processing component 900 that may be used in an embodiment of the contact center architecture 900 to practice the technologies disclosed herein such as, for example, one or more components of the call handler 110 or the speech analytics component 120. In general, the term "processing component" may be exemplified by, for example, but without limitation: a various types of computers, servers, blades, gateways, switches, and the like, as well as any combination of devices or entities adapted to perform the functions described herein.

As shown in FIG. 9, the processing component 900 may include one or more processors 901 that may communicate with other elements within the processing component 900 via a bus 905. The processor 901 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 900 may also include one or more communication interfaces 902 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 900 may further include an input/output controller 903 that may communicate with one or more input devices or peripherals using an interface 904, such as, but not limited to: a keyboard, a mouse, a touch screen/display input, microphone, pointing device, etc. The input/output controller 903 may also communicate with output devices or peripherals, such as displays, printers, speakers, headsets, banner displays, etc.

The processor 901 may be configured to execute instructions stored in volatile memory 806, non-volatile memory 907, or other forms of computer-readable storage media accessible to the processor 901. The volatile memory 906 may comprise various types of memory technologies, including, but not limited to: random access memory ("RAM"), dynamic random access memory ("DRAM"), static random access memory ("SRAM"), and other forms well known to those skilled in the art. The non-volatile memory 907 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 907 may store program code and data, which also may be loaded into the volatile memory 906 at execution time. Specifically, the non-volatile memory 807 may store one or more program modules 909, such as the call progress module 210, the navigation module 220, and/or the analytics module 235 described above containing instructions for performing the processes and/or functions associated with the technologies disclosed herein, and/or operating system code 908. In addition, these program modules 909 may also access, generate, or store data 910, in the non-volatile memory 907, as well as in the volatile memory 906. The volatile memory 906 and/or non-volatile memory 907 may be used to store other information including, but not limited to: records, applications, programs, scripts, source code, object code, byte code, compiled code, interpreted code, machine code, executable instructions, or the like. These may be executed or processed by, for example, the processor 901 and/or may form a part of, or may interact with, the program modules 909.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for advancing progress of a call connected to a machine to attempt to reach a live party, comprising the steps of:
    establishing a call leg from a call handler handling the call to a speech analytics system configured to analyze audio of the call over the call leg to detect one or more keywords being spoken on the call;
    receiving an event at the call handler from the speech analytics system as a result of the speech analytics system detecting a particular keyword being spoken in the audio of the call;
    carrying out an action with respect to the call by call handler based on the event, the action configured to advance the progress of the call to further the attempt to reach the live party; and
    upon carrying out the action:
        determining by the call handler that the call has reached the live party; and
        upon determining the call has reached the live party, connecting the call with a second live party by the call handler so that the second live party can converse with the live party reached on the call.

2. The method of claim 1, wherein the call leg is established from the call handler to the speech analytics system based on the call handler determining the call is connected to the machine.

3. The method of claim 2 further comprising determining by the call handler the call is connected to the machine by analyzing a cadence of the audio on the call.

4. The method of claim 1, wherein the machine comprises an auto attendant system.

5. The method of claim 1, wherein the event indicates to select a menu option to reach the live party and the action carried out by the call handler comprises sending at least one of a dual-tone multi-frequency signal and a sound over the audio of the call to select the menu option.

6. The method of claim 1, wherein the event indicates to enter a telephone extension to reach the live party and the action carried out by the call handler comprises sending at least one of a plurality of dual-tone multi-frequency signals and a plurality of sounds over the audio of the call to enter the telephone extension.

7. The method of claim 1 further comprising the step of setting a timer wherein the call handler disconnects the call upon the call failing to reach the live party before an expiry of the timer.

8. A non-transitory, computer-readable medium comprising computer-executable instructions for advancing progress of a call connected to a machine to attempt to reach a live party, that when executed, cause a call handler to:
  establish a call leg to a speech analytics system configured to analyze audio of the call over the call leg to detect one or more keywords being spoken on the call;
  receive an event from the speech analytics system as a result of the speech analytics system detecting a particular keyword being spoken in the audio of the call;
  carry out an action with respect to the call based on the event, the action configured to advance the progress of the call to further the attempt to reach the live party; and
  upon carrying out the action:
    determine the call has reached the live party; and
    upon determining the call has reached the live party, connect the call with a second live party so that the second live party can converse with the live party reached on the call.

9. The non-transitory, computer-readable medium of claim 8, wherein the call leg is established to the speech analytics system based on the computer-executable instructions causing the call hander to determine the call is connected to the machine.

10. The non-transitory, computer-readable medium of claim 9, wherein the computer-executable instructions are configured to cause the call handler to determine the call is connected to the machine by analyzing a cadence of the audio on the call.

11. The non-transitory, computer-readable medium of claim 8, wherein the machine comprises an auto attendant system.

12. The non-transitory, computer-readable medium of claim 8, wherein the event indicates to select a menu option to reach the live party and the action carried out by the call handler comprises sending at least one of a dual-tone multi-frequency signal and a sound over the audio of the call to select the menu option.

13. The non-transitory, computer-readable medium of claim 8, wherein the event indicates to enter a telephone extension to reach the live party and the action carried out by the call handler comprises sending at least one of a plurality of dual-tone multi-frequency signals and a plurality of sounds over the audio of the call to enter the telephone extension.

14. The non-transitory, computer-readable medium of claim 8, wherein the computer-executable instructions are configured to cause the call handler to set a timer so that the call handler disconnects the call upon the call failing to reach the live party before an expiry of the timer.

15. A system for advancing progress of a call connected to a machine to attempt to reach a live party, comprising:
  a call handler configured to:
    establish a call leg to a speech analytics component configured to analyze audio of the call over the call leg to detect one or more keywords being spoken on the call;
    receive an event from the speech analytics component as a result of the speech analytics component detecting a particular keyword being spoken in the audio of the call;
    carry out an action with respect to the call based on the event, the action configured to advance the progress of the call to further the attempt to reach the live party; and
    upon carrying out the action:
      determine the call has reached the live party; and
      upon determining the call has reached the live party, connect the call with a second live party so that the second live party can converse with the live party reached on the call.

16. The system of claim 15, wherein the call leg is established to the speech analytics component based on the call handler determining the call is connected to the machine.

17. The system of claim 16, wherein the call handler is further configured to determine the call is connected to the machine by analyzing a cadence of the audio on the call.

18. The system of claim 15, wherein the machine comprises an auto attendant system.

19. The system of claim 15, wherein the event indicates to select a menu option to reach the live party and the action carried out by the call handler comprises sending at least one of a dual-tone multi-frequency signal and a sound over the audio of the call to select the menu option.

20. The system of claim 15, wherein the event indicates to enter a telephone extension to reach the live party and the action carried out by the call handler comprises sending at least one of a plurality of dual-tone multi-frequency signals and a plurality of sounds over the audio of the call to enter the telephone extension.

21. The system of claim 15, wherein the call handler is further configured to set a timer so that the call handler disconnects the outbound call upon the call failing to reach the live party before an expiry of the timer.

* * * * *